United States Patent
Krause (10) Patent No.: US 9,434,289 B2
(45) Date of Patent: Sep. 6, 2016

(54) UNDER VEHICLE CARGO RACK AND SECURING MECHANISM

(71) Applicant: Blane Alan Krause, Lee's Summit, MO (US)

(72) Inventor: Blane Alan Krause, Lee's Summit, MO (US)

( * ) Notice: Subject to any disclaimer, the term of this patent is extended or adjusted under 35 U.S.C. 154(b) by 5 days.

(21) Appl. No.: 14/291,068

(22) Filed: May 30, 2014

(65) Prior Publication Data

US 2014/0356115 A1    Dec. 4, 2014

Related U.S. Application Data

(60) Provisional application No. 61/956,081, filed on May 31, 2013.

(51) Int. Cl.
| | | |
|---|---|---|
| *B60P 1/02* | (2006.01) | |
| *B60P 1/44* | (2006.01) | |
| *B60P 7/08* | (2006.01) | |
| *B60R 9/00* | (2006.01) | |
| *B60P 3/40* | (2006.01) | |

(52) U.S. Cl.
CPC ............ *B60P 1/4492* (2013.01); *B60P 1/4414* (2013.01); *B60P 3/40* (2013.01); *B60P 7/08* (2013.01); *B60R 9/00* (2013.01)

(58) Field of Classification Search
CPC ............ B60P 1/02; B60P 1/00; B60P 1/022; B60P 1/025
USPC ............... 414/495, 679; 224/402–405; 296/3
See application file for complete search history.

(56) References Cited

U.S. PATENT DOCUMENTS

| | | | |
|---|---|---|---|
| 2,570,802 | A | 10/1951 | Hatteburg |
| 2,855,217 | A | 10/1958 | Bagwell |
| 2,947,566 | A | 8/1960 | Tower |
| 3,891,262 | A | 6/1975 | Brunel |
| 4,121,849 | A | 10/1978 | Christopher |
| 4,138,046 | A | 2/1979 | Freze |
| 4,659,131 | A | 4/1987 | Flournoy |
| 4,813,584 | A | 3/1989 | Wiley |
| 4,869,628 | A | 9/1989 | Fletcher |
| 5,037,152 | A | 8/1991 | Hendricks |
| 5,038,983 | A | 8/1991 | Tomososki |
| 5,108,141 | A | 4/1992 | Anderson |
| 5,190,337 | A | 3/1993 | McDaniel |
| 5,338,136 | A | 8/1994 | Hetchler |
| 5,427,289 | A | 6/1995 | Ostor |
| 5,431,472 | A | 7/1995 | Coffland |
| 5,439,152 | A | 8/1995 | Campbell |
| 5,560,666 | A | 10/1996 | Vieira |
| 5,853,278 | A | 12/1998 | Frantz |
| 6,168,359 | B1 | 1/2001 | Smith |
| 6,179,184 | B1 | 1/2001 | Belinky |
| 6,193,452 | B1 | 2/2001 | Skiba |
| 6,202,909 | B1 | 3/2001 | Belinky |
| 6,203,259 | B1 | 3/2001 | Christensen |

(Continued)

*Primary Examiner* — William Gilbert
(74) *Attorney, Agent, or Firm* — Lathrop & Gage LLP (57) ABSTRACT

A cargo hauling mechanism for safely transporting long materials under a vehicle is disclosed. The cargo hauling mechanism includes a support assembly suspended from the frame of the vehicle and a support assembly suspended from the hitch of the vehicle. Each assembly supports one end of the cargo and has two horizontal members that clamp against the cargo to securely hold the cargo in fixed position during transport. Long cargo is slid into the support assemblies from the back of the vehicle and the support assemblies are manually compressed with a clamp at each end of the support assemblies.

14 Claims, 6 Drawing Sheets

(56) References Cited

U.S. PATENT DOCUMENTS

| | | |
|---|---|---|
| 6,343,826 B2 | 2/2002 | Bohannon |
| 6,471,455 B2 | 10/2002 | Skiba |
| 6,632,055 B2 | 10/2003 | Kania |
| 6,761,387 B2 | 7/2004 | Sloss |
| 6,830,418 B2 | 12/2004 | Keramidis |
| 6,935,671 B2 | 8/2005 | Bruford et al. |
| 7,494,169 B2 | 2/2009 | Collins |
| 7,758,091 B1 | 7/2010 | McCall |
| 7,832,608 B1 | 11/2010 | Bauer |
| 8,240,963 B2 | 8/2012 | Estrada |
| 8,608,219 B1 | 12/2013 | Platto et al. |
| 8,662,366 B1 | 3/2014 | DeZonia et al. |
| 8,777,288 B2 | 7/2014 | Johnasen |
| 2003/0147732 A1* | 8/2003 | Bellis, Jr. ............... B60P 3/122 414/495 |
| 2004/0245795 A1 | 12/2004 | Hansen |
| 2008/0211247 A1 | 9/2008 | Tarquinio |

\* cited by examiner

UNDER VEHICLE CARGO RACK AND SECURING MECHANISM

CROSS-REFERENCE TO RELATED APPLICATIONS

This application claims priority to U.S. Provisional Patent Application Ser. No. 61/956,081 filed on May 31, 2013.

STATEMENT REGARDING FEDERALLY SPONSORED RESEARCH OR DEVELOPMENT

Not applicable.

TECHNICAL FIELD

The present invention relates generally to a system for hauling cargo on a vehicle. More specifically, the present invention discloses a system which supports and secures long cargo onto a rack that is suspended under the vehicle.

BACKGROUND

Safely hauling long materials across public roads typically requires the use of a long flatbed truck or long trailer. Contractors or homeowners with home improvement projects will typically either pay a third party to deliver long materials or attempt to unsafely haul the long materials across the roof of an SUV or over extend past the bed of a pickup truck. Paying for delivery of long materials is the safest approach; however, this must be scheduled in advance and requires careful planning of schedule and an accurate estimate of material quantities.

Most pickup trucks have cargo boxes that are less than 8 ft in length; therefore, hauling materials that are longer than 12 ft can be difficult and dangerous. Cargo racks and ladder racks that extend over the truck cab are readily available for hauling long material up to 12 feet; however, these racks can be costly, cumbersome to install, unattractive when not in use, and require strapping or tying down of material onto the rack. These tall cargo racks can also be dangerous to other people on the highway. The heavy materials are well above the height of car windshields, and if not tied down properly, other drivers are at risk. Hauling the materials close to the ground is much safer because it is unlikely that loose cargo will become airborne.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to a cargo hauling mechanism suspended under the frame of a moving vehicle with horizontal members perpendicular to length of vehicle that support long cargo at a minimum of two points along the cargo length. Each cargo support location comprises an upper and a lower horizontal member that encompass the cargo and compress against top and bottom of the cargo surfaces to securely hold the cargo in place during transport. The support members provide a cargo rack when mounted below front or rear bumper of the vehicle and at secondary location proximate midpoint of the vehicle.

Compression of the lower support member toward the upper member is provided by a threaded hand clamping mechanism suspended from each end of the upper member. Rotation of the hand clamps at each end of the upper member lifts or lowers the lower member along with suspended weight of the cargo.

The mechanism also comprises a mounting interface between the upper horizontal member and the frame of the vehicle body. The horizontal member located proximate midpoint of the vehicle is mounted with an adjustable height bracket that securely binds the upper member to base of the vehicle frame. A bent hook of a J-bolt slips into a hole on the side of the vehicle frame and binds the adjustable height bracket to the base of the frame when tightened. The horizontal member located at rear or front of the vehicle is mounted with an adjustable height bracket that securely bolts under a ball mount in a hitch receiver of the vehicle.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views.

DETAILED DESCRIPTION

With reference to the drawings, wherein like reference characters designate like parts throughout the different views, a vehicle cargo hauling mechanism is disclosed. More specifically, a system for hauling long materials under a vehicle is disclosed, where the system securely clamps materials into a rack near the ground while maintaining more than 4 inches of minimum ground clearance. Through this system, long materials up to the full length of the vehicle can be safely transported across public roads without the aid of a flatbed truck or long trailer. This system also reduces the risk of injury from hauling poorly secured materials which are elevated to the roof of a vehicle or over extended from the back of a pickup truck.

Figure 1:
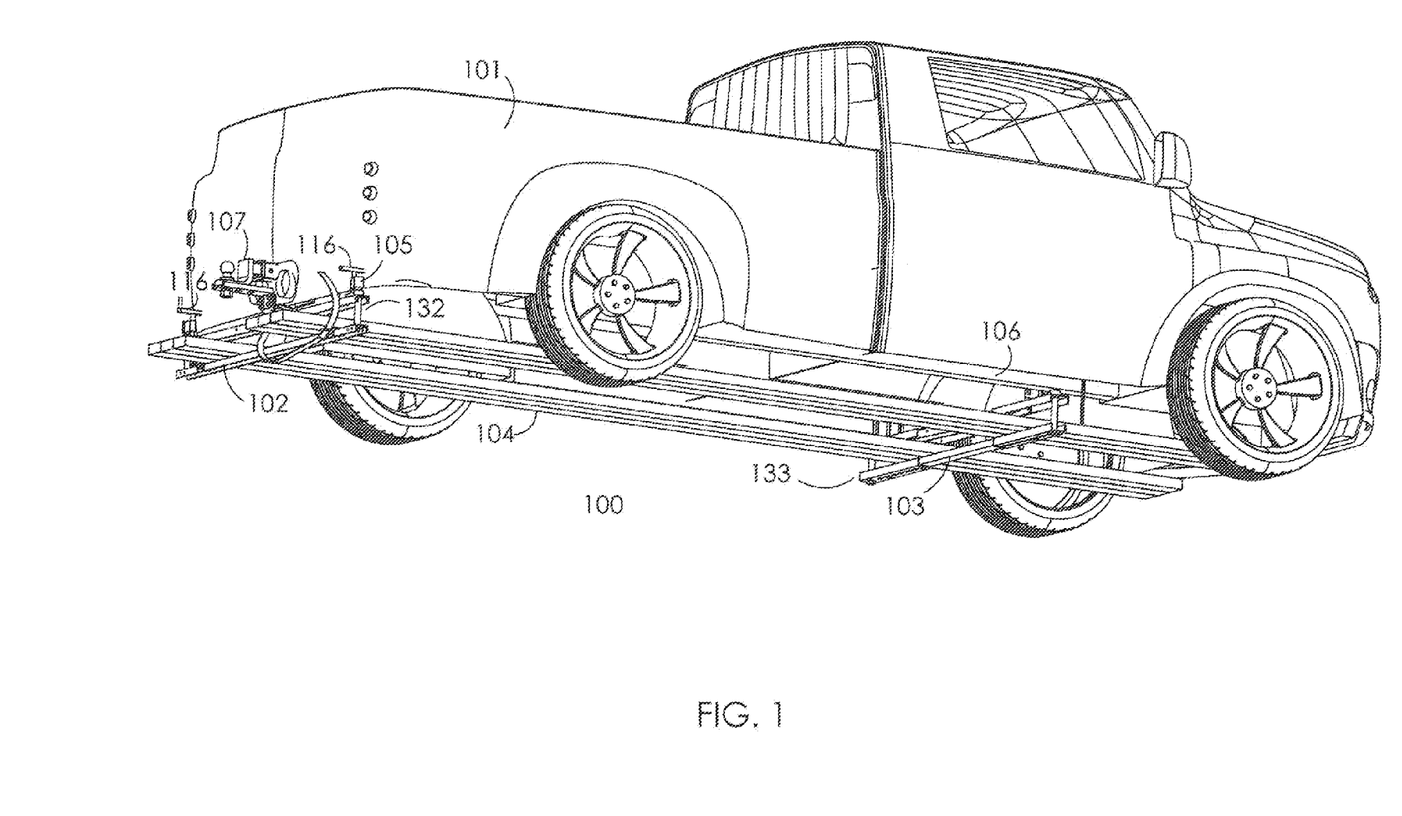
FIG. 1 is a perspective view of a vehicle cargo hauling mechanism capable of safely transporting long materials in accordance with an embodiment of the present invention.

Referring initially to FIG. 1, a vehicle cargo hauling mechanism 100 in accordance with an embodiment of the present invention is depicted. The vehicle cargo hauling mechanism 100 comprises support assemblies 132, 133 mounted under a vehicle 101 with a horizontal support member 102 located at rear of the vehicle 101 and a support member 103 at proximate midpoint of the vehicle 101. Long cargo 104 is placed lengthwise under the vehicle 101 and rests on the members 102, 103 with each member supporting a portion of the total cargo weight. Each end of the horizontal support members 102, 103 is suspended from a threaded hand clamp 105. A rotating handle 116 of the clamp 105 raises and lowers each end of the support members 102, 103 with the cargo 104. The centrally located support assembly 133 is structurally supported from a frame 106 of the vehicle 101 and the rear support assembly 132 is supported indirectly to the frame 106 by a vehicle hitch ball mount 107.

Figure 2:
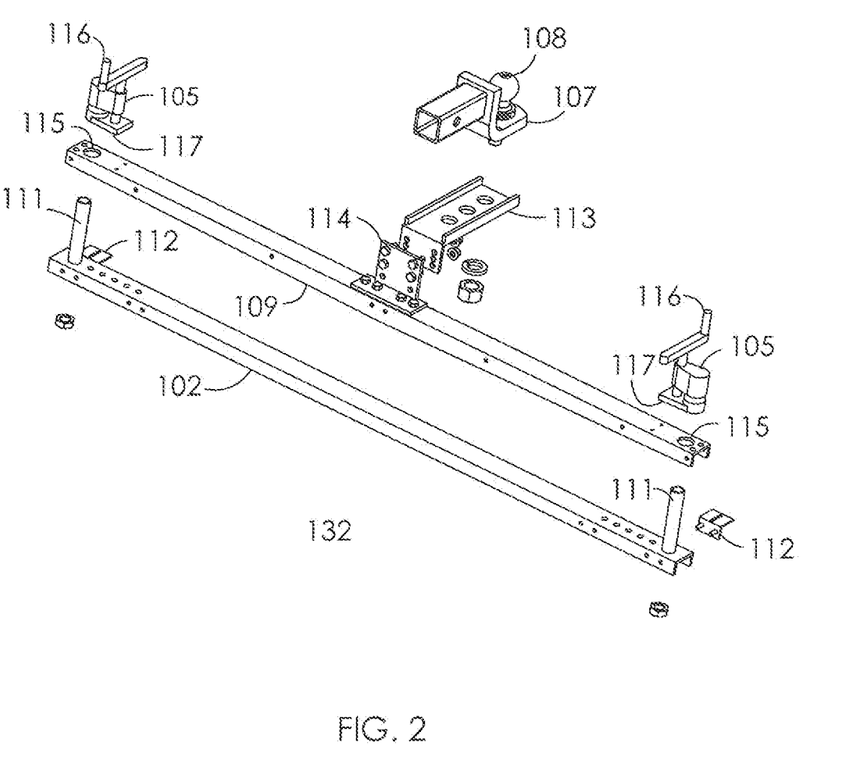
FIG. 2 is a perspective view of a rear mounted cargo support assembly in accordance with an embodiment of the present invention.

Referring to FIG. 2, an embodiment of the present invention is shown having the horizontal support member 102 suspended at each end by a pipe nipple 111 that is inserted through a hole 115 in a top channel 109. The hole 115 has a diameter slightly larger than diameter of the pipe nipple 111 and allows the pipe nipple 111 to travel freely through the hole 115. Each pipe nipple 111 is terminated with the pipe clamp 105 at each end of the support member 102. This allows weight of the support member 102 to suspend from a flat clamping surface 117 of the pipe clamp 105 onto surface of the top channel 109. The pipe nipple 111 is threaded into or welded to the support member 102 in a generally perpendicular direction to support member 102. The rotating handle 116 of the threaded pipe clamp 105 at each end of the top channel 109 raises and lowers the support member 102.

The assembly in FIG. 2 comprises the rear cargo support assembly 132 to be mounted to the hitch of the vehicle 101. An L-shaped bracket 113 bolts under a hitch ball 108 to securely mount the rear support assembly 132 to the ball mount 107. The top channel 109 bolts to a multi-hole bracket 114. The overlap of the multi-hole bracket 114 with the flat surface of the L-shaped bracket 113 forms a brace and allows for height adjustment of the top channel 109 in reference to the ball mount 107. Further height adjustment to the top channel 109 can be provided with replacement of the fixed ball mount 107 with an adjustable ball mount.

Bottom edges of the top channel 109 are tapered from center of channel to outer ends. As the clamps 105 are tightened, the support member 102 compresses cargo against the top channel 109. With center of the top channel 109 being slightly deeper than its opposing ends, compression begins at center of the top channel 109 and evenly spreads pressure across width of the cargo 104 as the clamps 105 are pressed against the cargo 104 and the top channel 109 flexes up in the center. The support member 102 can be sized wide enough to support a 4 feet wide sheet of material such as plywood.

Figure 3:
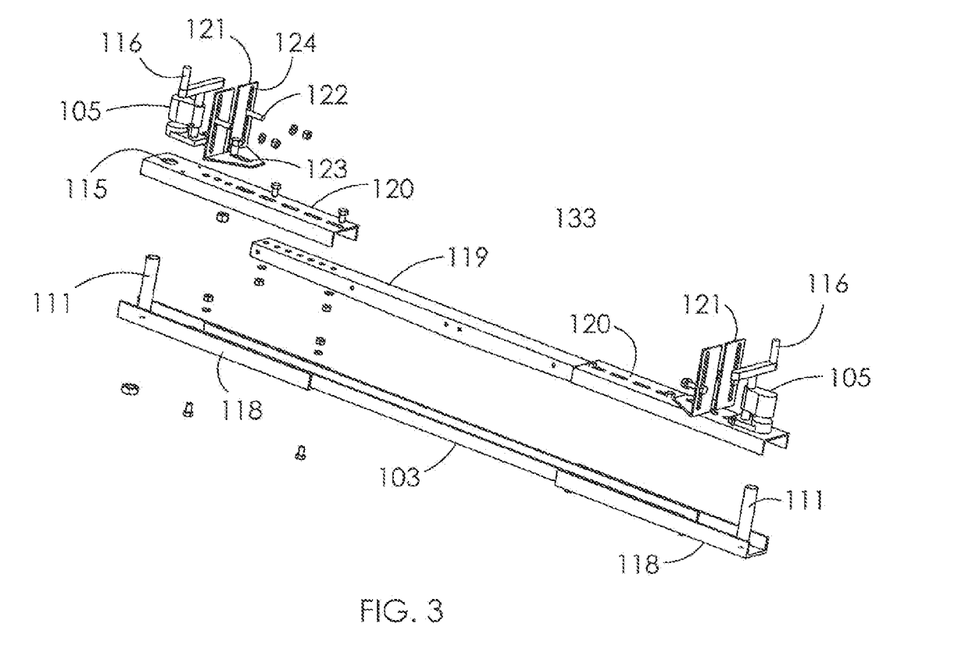
FIG. 3 is a perspective view of a center mounted cargo support assembly in accordance with an embodiment of the present invention.

Referring to FIG. 3, a detailed view of the center cargo support assembly 133 is depicted. The center cargo support assembly 133 replicates the function of the rear cargo support assembly 132 but is assembled in sections to accommodate for varying vehicle widths and is mounted under the vehicle 101. A bottom channel leg 118 is bolted to each end of the bottom member 103 and has multiple slotted holes to provide optional bolting locations. The bolt hole pattern in each bottom channel leg 118 and at each end of the bottom member 103 allows for variable length in the three part assembly.

Top channel legs 120 have a similar bolt hole pattern as the bottom channel legs 118 and provide for variable length of the top three part assembly when mated with the top member 119. The pipe nipple 111 travels through the hole 115 in each top channel leg 120 and is terminated with the pipe clamp 105. Rotating the handle 116 of the pipe clamp 105 raises and lowers each end of the bottom member 103.

The top member 119 is tapered toward its center to provide clamping pressure starting from the center outward as the clamps 105 are tightened.

Figure 4:
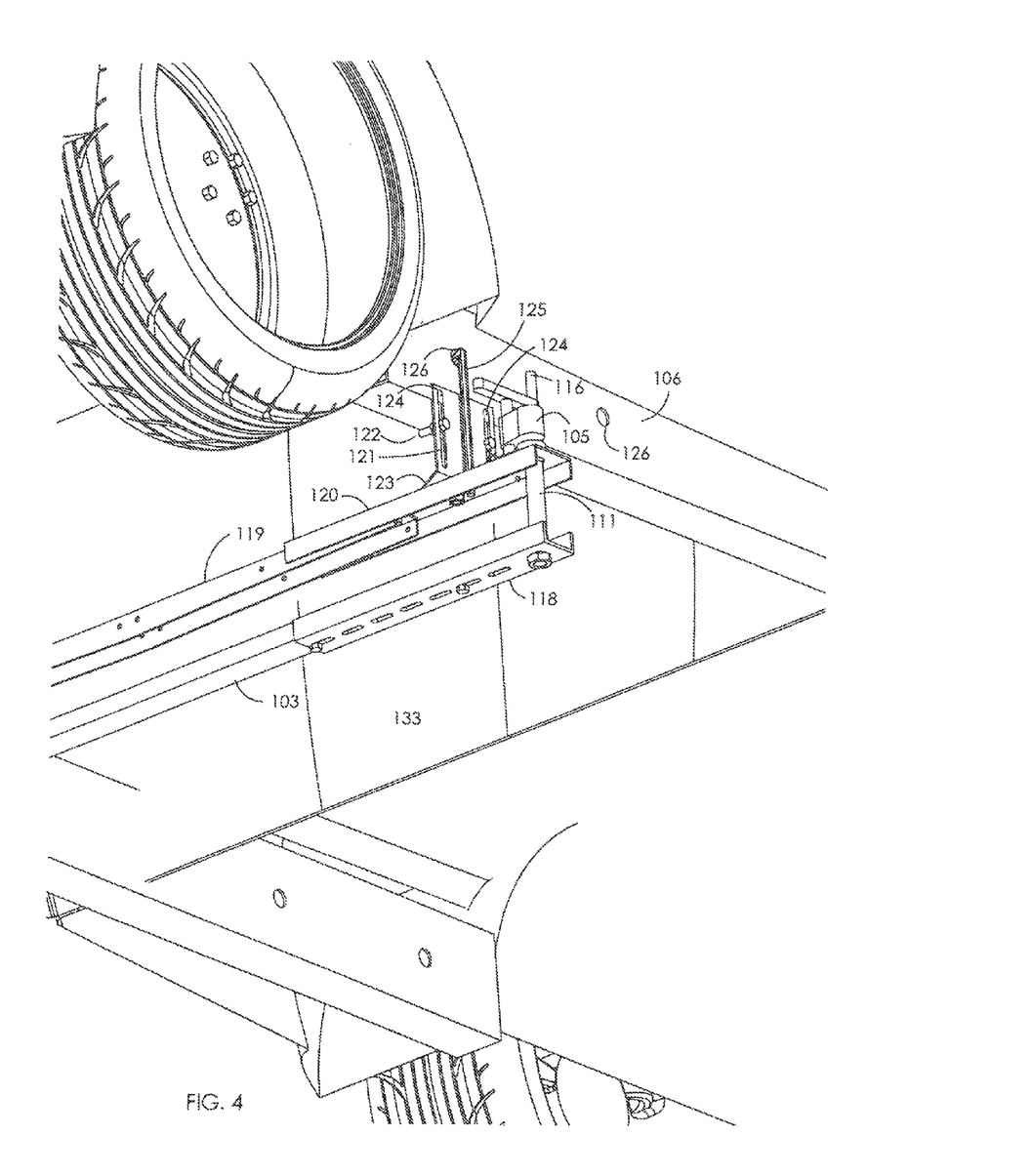
FIG. 4 is a perspective view of a portion of the center mounted cargo support assembly suspended under a vehicle frame in accordance with an embodiment of the present invention.

A height adjuster bracket 121 provides a means to suspend the center cargo support assembly 133 from the frame 106 of the vehicle 101. FIG. 4 shows a view of the center cargo support assembly 133 as it is installed under a truck frame 106. Most truck frames are 4 to 6 inch rectangular steel tube 106 and have multiple holes 126 on the outside surface. The holes 126 allow for an opportunity to clamp the center cargo support assembly 133 to the frame 106 at optional locations along the length of the frame 106. A rigid wire J bolt 125 with threaded shaft is inserted into one of the holes 126 on the outermost surface of the frame 106. The threaded J bolt 125 is routed through the closest mounting hole in the top channel leg 120. In order to securely fasten the center cargo support assembly 133 at the correct elevation, the height adjuster bracket 121 is mounted between base of the truck frame 106 and the top channel leg 120.

The height adjuster bracket 121 rests flat against the outside of the vehicle frame 106 on both sides of the vehicle 101. A slotted hole 123 in the base of the bracket 121 is bolted to the top channel leg 120. The vertical face of the height adjuster bracket 121 has two slotted holes 124; By installing a long, fully threaded bolt 122 with a tightened nut in each slot 124, the final elevation of the center cargo support assembly 133 can be easily adjusted. As a nut on the threaded J bolt 125 is tightened against the top channel leg 120 from below, the long bolts 122 in the vertical face of the height adjuster bracket 121 are pulled up against the bottom face of the truck frame 106. After the threaded J bolt 125 is fully tightened, the center cargo support assembly 133 is secure and can carry the weight of the cargo 104 from each side of the vehicle 101.

Figure 5:
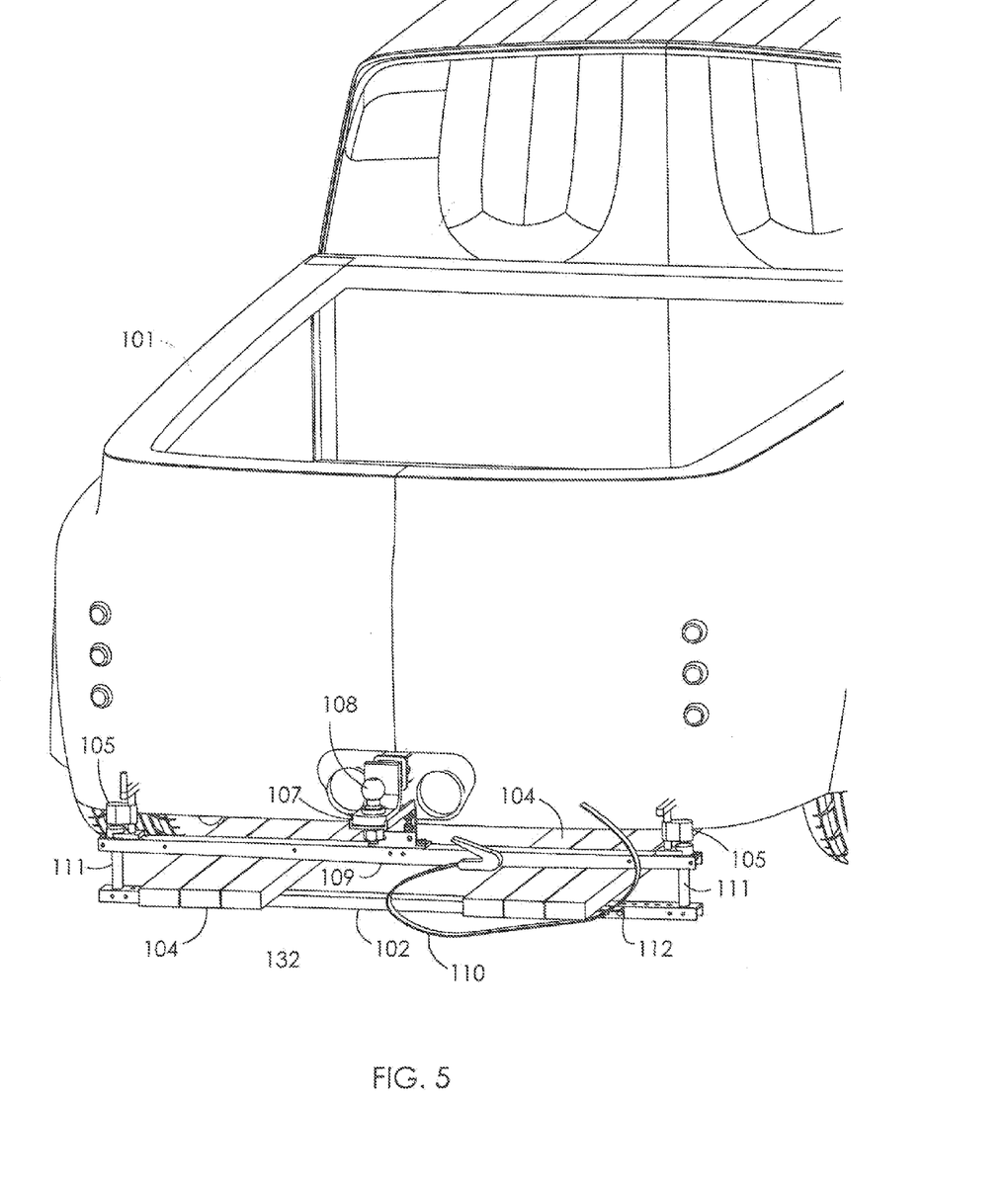
FIG. 5 is a perspective view of the rear mounted cargo support assembly suspended from a vehicle hitch in accordance with an embodiment of the present invention.

FIG. 5 shows the back cargo support assembly 132 installed on the vehicle 101 with the cargo 104 in place. A strap bracket 112 is bolted to side of the support member 102 near each end and provides a secure anchor to attach a nylon ratchet strap 110 for further securing of the cargo 104. To fully secure the cargo 104 and prevent slipping during sudden stops of the vehicle 101, the nylon ratchet strap 110 compresses the cargo 104 in a horizontal direction while the threaded clamps 105 compress the cargo 104 in the vertical direction.

Figure 6:
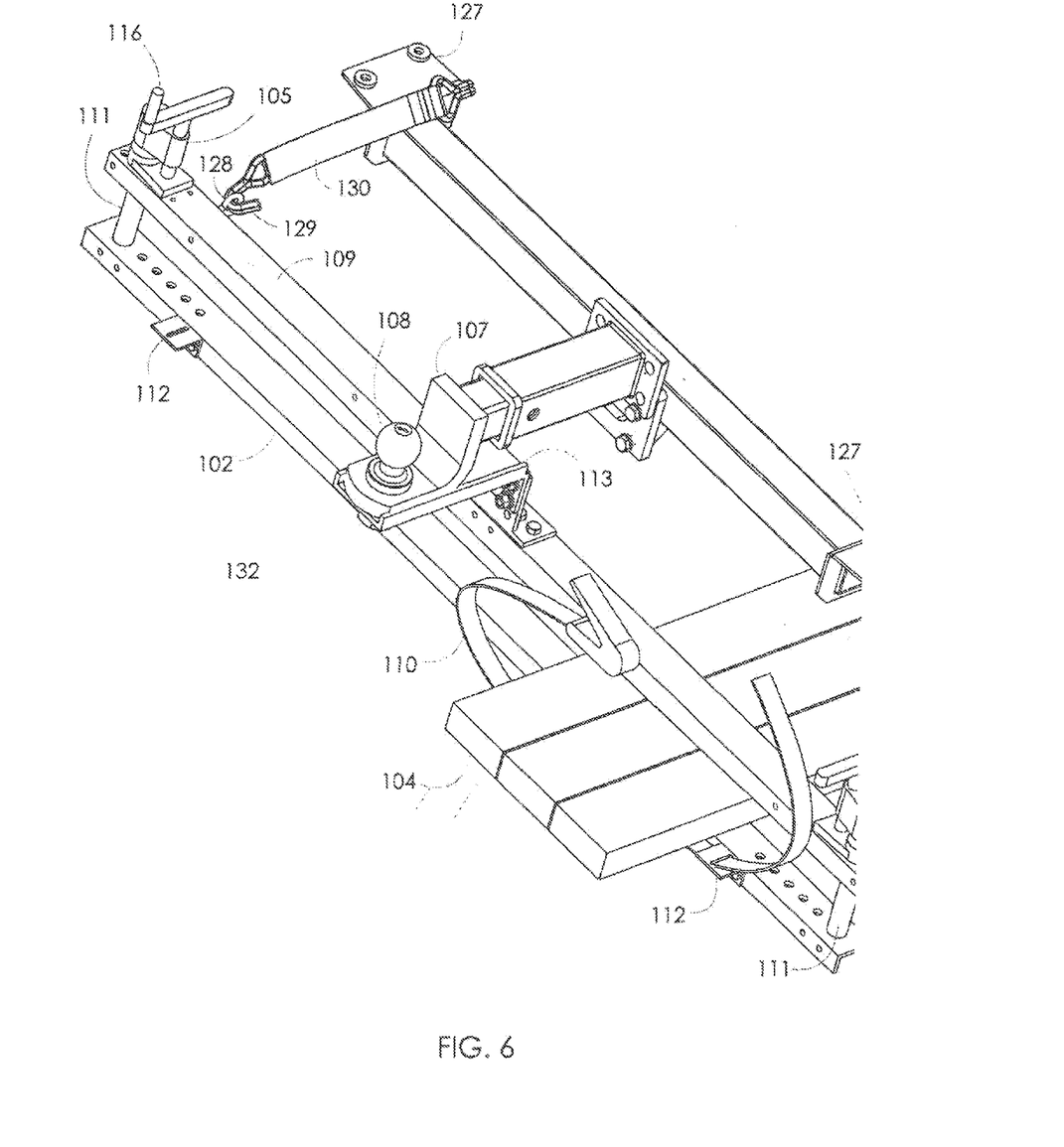
FIG. 6 is a perspective view of the rear mounted cargo support assembly with the vehicle removed in accordance with an embodiment of the present invention.

FIG. 6 is a perspective view of the rear mounted cargo support assembly 132 with the vehicle 101 removed. To eliminate any wobble in the cargo support assembly 132 when suspended from the hitch mount 107, a nylon cam strap 130 is installed from each end of the top channel leg 109 to welded frame of a hitch receiver 127 located under the vehicle 101. An eyebolt 128 inserted into edge of the top channel 109 provides eye for a cam strap hook 129. Even tightening of the nylon cam strap 130 on each end of the cargo support assembly 132 stabilizes the 4 foot span of the cargo 104 and secures the cargo support assembly 132 parallel to the rear bumper of the vehicle 101.

The top member 119 of the center cargo support assembly 133 and the top channel 109 of the rear cargo support assembly 132 must be installed at an elevation that allows the cargo 104 to clear all vehicle parts, i.e. shocks, differential case, muffler, that are typically suspended underneath the vehicle 101. Most adjustability of this elevation for the rear cargo support assembly 132 is provided by the proper selection of the hitch ball mount 107. Standard ball mounts 107 are available in varying ball heights; The nominal sizes can typically be purchased in increments of 2 inches. Adjustable height ball mounts are also readily available. Finer adjustment of the cargo elevation is provided with the adjustable mating holes between the multi-hole bracket 114 and the L-shaped bracket 113.

The thread length on the clamps 105 provide, at least, 2 inches of adjustability when loading and clamping the cargo 104 in place. The length of the vertical pipe members 111 are selected to provide an opening depth between the top member and the bottom member that adjusts between approximately 0.5 and 2.5 inches. This provides an ideal opening range for loading and securing one row of 2 inch nominal construction lumber or several rows of lumber that are less than 1 inch thick. The vertical pipe members 111 are pre-threaded pipe nipples that are readily available in varying lengths. Slightly increasing the length of the pipe nipples 111 allows for an opening depth up to 4 inches and may allow for up to 3.5 inches of cargo depth.

For hauling rigid material that is 16 ft in length or less, only two cargo support assemblies 132, 133 are typically required. For 16 foot rigid material, the center cargo support assembly 133 is mounted below the front door of the vehicle at a point approximately 10 to 12 feet from the rear hitch mounted support assembly 132. The first 10 to 12 ft of material spans the rear and the center cargo support assemblies 132,133 and the remaining 4 to 6 feet of material cantilevers past the center cargo support assembly 133 to below the vehicle's engine. If the cargo material 104 is longer than 18 feet, the front cantilevered section of material must be supported with nylon straps near the front bumper or an additional $3^{rd}$ cargo support assembly must be mounted at the front of the vehicle 101. A $3^{rd}$ cargo support assembly requires a standard front mounted hitch and is identical to the cargo support assembly 132 mounted at the rear of the vehicle 101.

When loading material onto the cargo hauling mechanism 100, the center support assembly 133 and the back support assembly 132 are fully opened with the clamps 105, and the material is loaded from the back end of the vehicle 101. Material is slid through the back support assembly 132 until it reaches the center support assembly 133. The front of the material can then be guided through the center support assembly 133 by pivoting off the back support assembly 132 and guiding the material through from the back of the vehicle 101. This works well if loading 16 foot boards on a rack 100 that has been installed with approximately a 12 foot span between the support assemblies 132, 133.

Loading 12 to 14 foot boards may not allow enough leverage from the back for guiding boards through the center support assembly 133. In this case, the front of the board must be lifted onto the center support assembly 133 by crouching down and reaching under the cab. With this approach, the boards must be placed on outermost edge of rack 100 first, and pushed toward the center of the vehicle 101.

When cargo hauling rack 100 is fully loaded with material such as lumber, the material can be centered on the cargo rack 100. When not fully loaded, material should be equally separated to each side of the cargo rack 100 as shown in FIG. 5. This will ensure that the load is balanced on the rack 100 during transport. The load is also more securely clamped the closer it is to the pipe clamps 105.

The cargo 104 should be extended about 6 inches past the back supporting assembly 132 with the ends evenly aligned. The cargo 104 is located above the strap bracket 112 so that the nylon strap 110 can compress the cargo 104 in the horizontal direction and secure the cargo 104 to the rack 100.

FIG. 5 shows how the strap is routed through the strap bracket 112 and around the cargo 104 placed on the right side of rack 100.

The present invention has been described in relation to particular embodiments, which are intended in all respects to be illustrative rather than restrictive. Alternative embodiments will become apparent to those of ordinary skill in the art to which the present invention pertains without departing from its scope. Substitutions may be made and equivalents employed herein without departing from the scope of the invention as recited in the claims. It will be understood that certain features and subcombinations are of utility and may be employed without reference to other features and subcombinations. This is contemplated and within the scope of the claims.

The invention claimed is:

1. A cargo hauling mechanism suspended under a structural frame of a vehicle body comprising:
    a first support assembly having opposing ends, a first top channel and an opposing first support member, the first top channel coupled to the structural frame and spanning approximately a width of the vehicle body, the first support member engaged to the first top channel;
    a brace for suspending a second support assembly to a vehicle hitch receiver, the second support assembly having opposing ends, a second top channel and an opposing second support member, the second top channel coupled to the structural frame and spanning approximately the width of the vehicle body, the second support member engaged to the second top channel;
    an adjustable lift device at each of the opposing ends of the first support assembly and the second support assembly and respectively coupled to the first support member and the second support member for raising and lowering the first support member relative to first the top channel and the second support member relative to the second top channel; and,
    a bracket near each end of the first support assembly for coupling the support assembly to the structural frame of the vehicle;
    wherein the adjustable lifting device provides movement of the first support member relative to the first top channel for securing a cargo load between the first top channel and the first support member.

2. The mechanism of claim 1, wherein the first support assembly has an adjustable width.

3. The mechanism of claim 1, wherein the adjustable lift device raises the first support member towards the first top channel such that cargo placed therebetween is in contact with both the first top channel and the first support member.

4. The mechanism of claim 1, wherein the top channel of the first support assembly is coupled to the structural frame in a fixed position.

5. The mechanism of claim 1, wherein the brace suspending the second support assembly from the vehicle hitch receiver is bolted to a ball mount with a hitch ball and a nut.

6. The mechanism of claim 1, wherein the second support assembly suspended from the hitch receiver is stabilized in a fixed position parallel to a vehicle bumper with an adjustable strap-rope, cable or chain at each of the opposing ends of the second support assembly.

7. The mechanism of claim 1 further comprising one or more straps for securing cargo to the second support member.

8. The mechanism of claim 1, wherein the structural frame of the vehicle is at least six inches above ground.

9. A cargo hauling mechanism suspended under a vehicle comprising:
- a first support assembly positioned between a rear of the vehicle frame and a front end of the vehicle, the first support assembly having a first top channel coupled to a structural frame of the vehicle and a first support member adjustably engaged to the first top channel;
- a second support assembly positioned proximate the rear of the vehicle frame, the second support assembly having a second top channel coupled to the structural frame and a second support member adjustably engaged to the second top channel; and,
- wherein the support member of the first and second support assemblies are manually adjustable relative to the first and second top channels by a plurality of adjustable lift devices.

10. The mechanism of claim 9, wherein the second support assembly is mounted to the vehicle through a vehicle hitch receiver.

11. The mechanism of claim 10, wherein the first support assembly and the second support assembly each have an adjustable width.

12. The mechanism of claim 11, wherein the adjustable lift device raises the first support member towards the first top channel such that cargo placed therebetween is in contact with both the first top channel and the first support member.

13. The mechanism of claim 12, wherein a brace suspending the second support assembly from the vehicle hitch receiver is bolted to a ball mount, said ball mount having a hitch ball and a nut.

14. The mechanism of claim 13, wherein the second support assembly suspended from the hitch receiver is stabilized in a fixed position parallel to a vehicle bumper with an adjustable strap, rope, cable, or chain at each opposing end.

* * * * *